United States Patent [19]

Reeves et al.

[11] Patent Number: 5,640,828

[45] Date of Patent: Jun. 24, 1997

[54] SPACER FOR AN INSULATED WINDOW PANEL ASSEMBLY

[75] Inventors: Myron D. Reeves, Ladysmith; Edward Schield, Medford, both of Wis.

[73] Assignee: Weather Shield Mfg., Inc., Medford, Wis.

[21] Appl. No.: 388,985

[22] Filed: Feb. 15, 1995

[51] Int. Cl.$^6$ .................................................. E06B 3/663
[52] U.S. Cl. .......................... 52/786.13; 52/172; 52/658; 52/730.4; 52/734.2; 52/786.1; 52/745.19; 72/369; 428/34
[58] Field of Search .............................. 52/202, 204, 595, 52/172, 631, 658, 717.02, 718.01, 730.3, 730.4, 730.5, 786.1, 786.13, 734.2, 745.19; 428/34; 72/369

[56] References Cited

U.S. PATENT DOCUMENTS

| | | | |
|---|---|---|---|
| 2,877,515 | 3/1959 | Haas | 52/172 |
| 3,030,673 | 4/1962 | London . | |
| 3,114,179 | 12/1963 | Briggs | 52/786.13 X |
| 3,280,523 | 10/1966 | Stroud et al. . | |
| 3,345,791 | 10/1967 | Shinefeld | 52/786.13 |
| 3,965,638 | 6/1976 | Newman | 52/786.13 |
| 4,019,295 | 4/1977 | Derner et al. . | |
| 4,057,945 | 11/1977 | Kessler . | |
| 4,080,482 | 3/1978 | Lacombe . | |
| 4,193,236 | 3/1980 | Mazzoni et al. . | |
| 4,411,115 | 10/1983 | Marzouki et al. . | |
| 4,551,364 | 11/1985 | Davies | 52/172 X |
| 4,574,553 | 3/1986 | Lisec . | |
| 4,597,232 | 7/1986 | Lingemann . | |
| 4,652,472 | 3/1987 | Davies | 428/34 |
| 4,660,271 | 4/1987 | Lenhardt | 72/369 X |
| 4,719,728 | 1/1988 | Eriksson et al. . | |
| 4,720,950 | 1/1988 | Bayer et al. . | |
| 4,850,175 | 7/1989 | Berdan . | |
| 4,890,438 | 1/1990 | Tosa et al. . | |
| 4,912,837 | 4/1990 | Bayer | 72/369 X |
| 5,079,054 | 1/1992 | Davies . | |
| 5,088,258 | 2/1992 | Schield et al. | 52/172 X |
| 5,255,481 | 10/1993 | Misera et al. . | |
| 5,313,762 | 5/1994 | Guillemet | 52/786.13 |
| 5,439,716 | 8/1995 | Larsen | 52/172 X |
| 5,512,341 | 4/1996 | Newby et al. | 428/34 X |
| 5,514,432 | 5/1996 | Lisec | 428/34 X |

FOREIGN PATENT DOCUMENTS

| | | | |
|---|---|---|---|
| 719082 | 1/1932 | France . | |
| 2457358 | 12/1980 | France . | |
| 8400191 | 12/1984 | Germany . | |
| 1-241329 | 9/1989 | Japan | 72/369 |
| 926881 | 5/1963 | United Kingdom | 52/204.595 |
| 1481712 | 8/1977 | United Kingdom | 72/369 |
| WO89/07495 | 8/1989 | WIPO | 72/369 |

*Primary Examiner*—Carl D. Friedman
*Assistant Examiner*—Laura A. Saladino
*Attorney, Agent, or Firm*—Price, Heneveld, Cooper, DeWitt & Litton

[57] ABSTRACT

An insulated window panel assembly for use in window and door assemblies having an improved insulating spacer between the window panes comprising the panel assembly. At least two panes of glass or other panel material are interconnected in parallel, spaced relationship by a spacer assembly. The spacer assembly is preferably a single length of tubing, generally rectangular in shape, having an outer wall of a first width interconnected to an inner wall of less width by generally concave sidewalls. The sidewalls also contain a bead of sealer material configured to seal with the adjacent window panes. A secondary seal is deposited on the outer wall and overlaps the sidewalls to also form a seal with the window panes. The spacer assembly is preferably one piece, bent to conform to the overall shape of the window panes wherein a first end of the spacer is connected to the opposite end. Folds may be made in the spacer along a crimp line formed in the inner wall to accommodate angular window pane configurations. Folding of the spacer about the crimp line deforms the sidewalls and a fraction of the inner and outer walls inwardly in order to prevent a width increase of any wall which may produce a point with the adjoining window pane.

19 Claims, 4 Drawing Sheets

_5,640,828_

SPACER FOR AN INSULATED WINDOW PANEL ASSEMBLY

BACKGROUND OF THE INVENTION

This invention relates generally to insulated windows and particularly to an insulated window panel assembly and a spacer for use in such a panel assembly, including a method for making the spacer and the window panel assembly.

Insulated windows typically include two or more panes of glass spaced from each other and mounted in a sash or other opening (FIG. 1). In early embodiments, the window panes were separated by blocks or strips of wood, cut to length, and fixed in the window opening. Alternatively, the window panes were received in rabbits or recesses formed in the sash and sealed therewith by a bead of adhesive about the window opening. Disadvantages of these structures include the relatively high cost in time and materials and the inability to insure an airtight space between the window panes.

In later insulated windows, the separated panes were assembled as a unit separate from the window opening or sash. The window panes were separated from each other by a plurality of rectangular or square lengths of metal tubing, interconnected at the ends by angled corner keys (FIG. 2). Each segment was cut to length and interconnected by the corner keys. The airtight integrity of the gap between the panes was provided by wrapping the joints between the corner keys and the segments of tubing with a seal. Additionally, each segment may have been filled with a desiccant. The gap or insulative space between the panes may also have been evacuated and refilled with a gas, such as Argon, to reduce conduction and heat transfer. However, as a result of the many joints, the Argon gas often escaped, despite the fact that a second seal often surrounded the entire perimeter of the space between the two window panes.

Another spacer used by most insulated window manufacturers includes a length of rectangular or square metal tubing (FIG. 3) bent about a mandrel (FIGS. 4A, 4B, 4C, and 4D) to form a pattern substantially conforming to the shape of the window panes. Bulging of the sides of the tubing at a bend is constrained by clamps located on each side of the bend (FIGS. 4A–4D) to maintain a uniform thickness of the spacer. A disadvantage of this construction is the need for the clamp and mandrel. If the sides are not constrained, the sides deform outwardly, forming projections which form a stress point on the surface of the glass panes, increasing the probability of a stress failure of the glass pane(s). Bending the spacer using the mandrel requires the side restraining clamps to avoid the stress points. Such a procedure results in slower production or increased capital expenditures for work-specific machines.

The instant invention provides a unique tubular spacer for insulated window panel assemblies which can be bent without mandrels or corner restraining clamps to produce angled spacers having uniform thickness and all of the advantages of a single, continuous spacer, including better sealing of an inert gas between the panes, ease of construction, and reduced costs.

SUMMARY OF THE INVENTION

According to one aspect of the invention, an insulated window panel assembly is provided for use in a window, including a pair of window panes spaced apart from each other by a spacer element disposed therebetween. The spacer element is generally rectangular in cross-sectional profile and of predetermined length having a first end interconnected to a second, opposite end. The spacer includes an outer wall having a first width and an inner wall having a width less than the outer wall. The inner and outer walls are interconnected by sidewalls, each of which are configured to receive a continuous bead of sealer. The spacer is disposed between the two panes and spaced inwardly from the peripheral edges of the two panes. It is contemplated that the spacer may be bent to the desired configuration, with the primary seal disposed on the sidewalls along a crimp line formed across the inner wall at predetermined locations.

According to another aspect of this invention, a spacer element for an insulated window panel assembly is provided comprising in combination a generally rectangular tube of predetermined length and having an outer wall of a first width and an inner wall having a width less than that of the outer wall. The inner and outer walls are interconnected by a pair of opposing, generally concave walls. A first end of the tube is connected to a second, opposite end of the tube through at least two corners to form a closed pattern. The corners of the spacer are formed about a crimp line extending across the inner wall wherein the inner wall and the generally concave sidewalls are deformed inwardly at the corners so as not to extend outwardly beyond the width of the outer wall. Deposited in each of the generally concave sidewalls and along the outer wall, prior to bending, is a bead of sealing material. The spacer is adapted to be disposed between two window panes and seal against the inner surface of each pane to provide an air-tight interior volume.

In another embodiment, the tubular spacer may contain a desiccant material to absorb moisture trapped between the two window panels once sealed by the spacer. Perforations formed in the inner wall allow access of the moisture to the desiccant. It is also contemplated that the spacer include a filling port or hole extending through both the inner and outer walls to permit the expansion and contraction of the air between the panels during assembly, and to permit the introduction of an inert gas, such as Argon. The filling port may be closed by a threaded plug or a resilient seal. It is also contemplated that the opposite ends of the spacer are interconnected by a key which has opposite ends tightly held by opposite ends of the spacer.

Yet another embodiment of the invention includes manufacturing the spacer and window panel assembly. In general, a length of tubing having an outer wall of a first dimension and an inner wall of a lesser dimension are interconnected by a pair of sidewalls. The length of the tubing is measured and cut to length. At least one end of the tubing then receives a connecting plug. A second, temporary plug is inserted on the opposite end to retain any material inside the tube. The cut length of tubing is then conveyed to a second station where the inner wall is drilled to provide a vent hole and additional holes to support accessories, such as mutton bars or grillwork. Once drilled, the tubing is conveyed to another station where it is crimped at two or more predetermined locations. Once crimped, the tubing is conveyed through a third station where at least one and preferably all beads of sealant are extruded on the sidewalls and outer wall. From the extruder, the length of tubing complete with sealer is folded by the assembler. Any temporary plug is pushed inwardly as the ends of the spacer are interconnected. The finished spacer assembly is then located between the two window panes. The spacer and window panes are then passed through a heated roller press to effect the bond between the panels. The vent hole in the spacer allows the air inside the spacer to equalize during the heating and cooling cycles. The vent may then be used to introduce a special gas into the spacer between the panes and closed. A patch is then placed over the vent. The finished window panel assembly is then inserted into a finished window sash or other structure.

The advantages provided by this invention and the method of manufacturing include the ability to produce an insulated window panel assembly wherein the insulated panes may be installed in the window opening (sash or door frame) as a unit. Additionally, the spacer between the two window panels provides fewer seams as a result of the continuous length of tubing, wherein the folded corners of the spacer have substantially the same maximum thickness as a straight segment, thus removing any concentrated stress points in the adjacent window panel resulting in less breakage. An additional advantage of the invention is that the primary and secondary seals may be deposited on the spacer after it has been cut to length but before it is bent to conform to the shape and size of the window panels, thus reducing the steps required during assembly. The builder or assembler can quickly form the spacer without special mandrels or clamps.

BRIEF DESCRIPTION OF THE DRAWING FIGURES

A better understanding of the invention and the advantages provided thereby may be obtained by referee& to the specification and the attached drawing figures, wherein:

FIG. 1 is a general illustration of an insulated window assembly, such as provided by this invention;

FIGS. 2 and 3 generally illustrate prior window panel assembly spacers;

FIGS. 4A, 4B, 4C, and 4D illustrate a prior method of forming the spacer assembly shown in FIG. 3;

Figure 11:
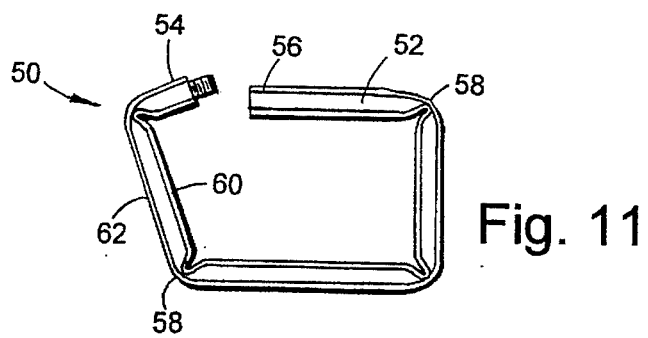

FIG. 11 generally illustrates the forming of the spacer; and

Figure 12:
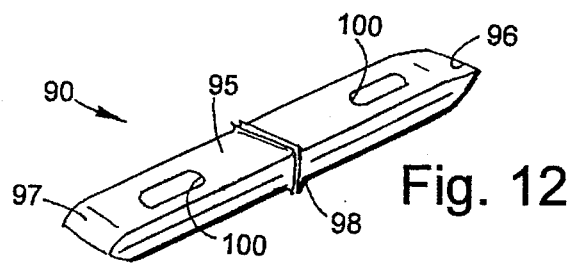

FIG. 12 illustrates a preferred embodiment of a key joining the ends of the spacer.

DETAILED DESCRIPTION OF THE PREFERRED EMBODIMENT

Figure 1:
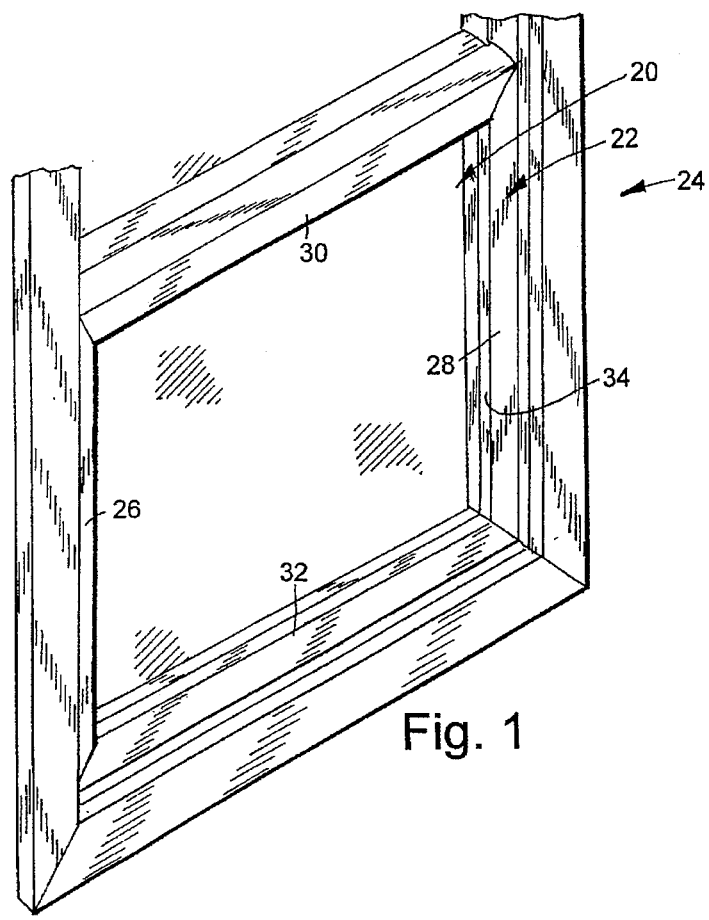
Figure 5:
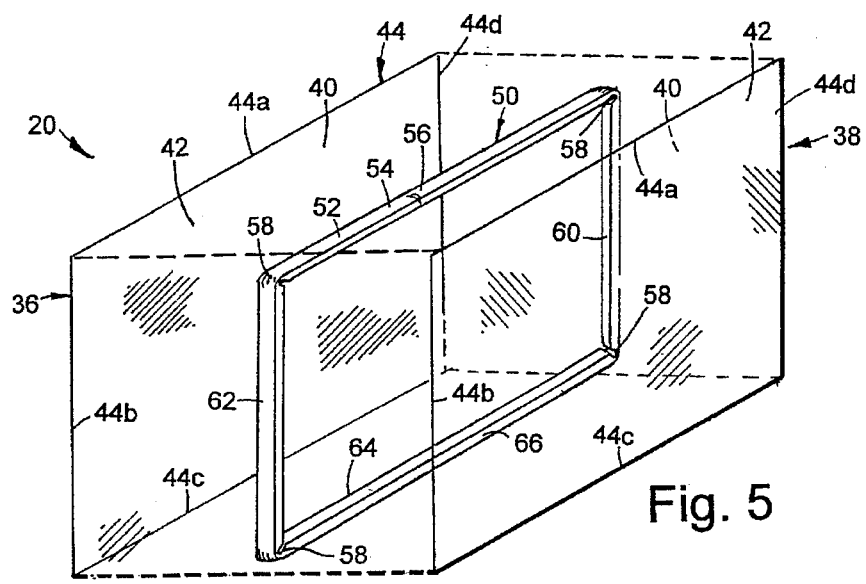
FIG. 5 is an exploded view of the window panel assembly and spacer of this invention.
Figure 2:
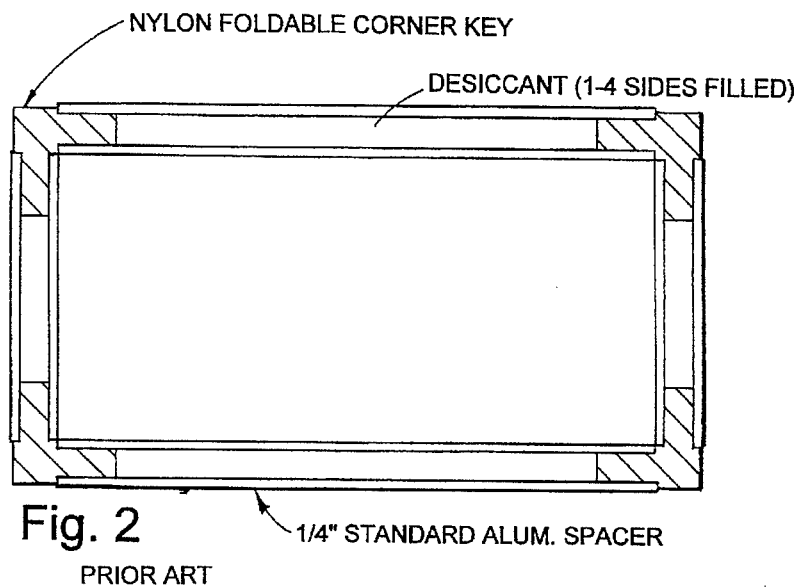
Figure 3:
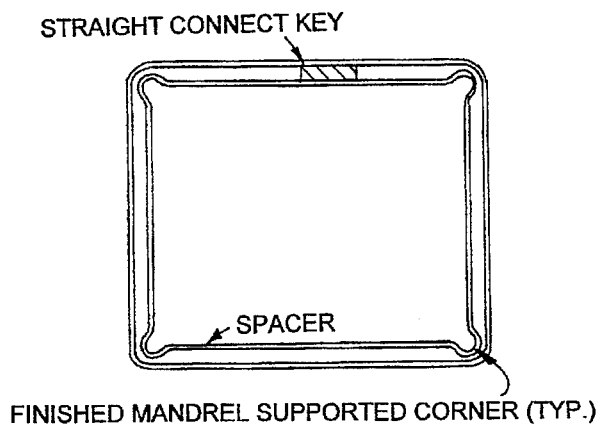
Figure 4B:
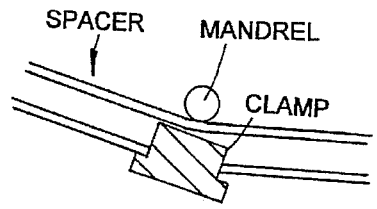
Figure 4C:
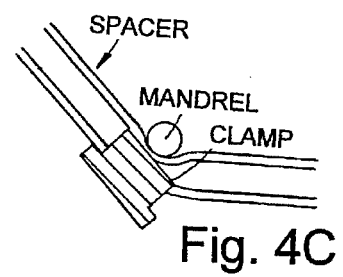
Figure 4A:
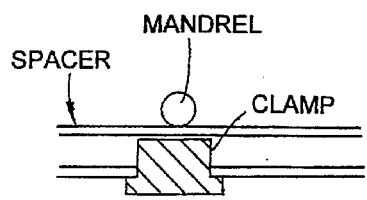
Figure 4D:
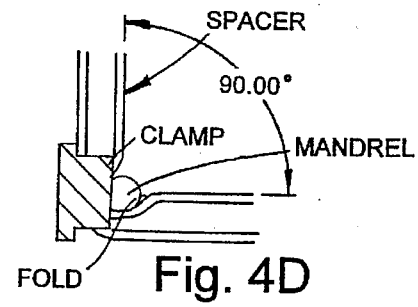

Referring to FIGS. 1 and 5, the window panel assembly 20 of this invention may be used in a window unit such as a double-hung window assembly shown as 24, or as a fixed window panel assembly or light in a wall, door, or other application. As shown in FIG. 1, window panel assembly 20 is preferably mounted in window sash 22, including vertically oriented stiles 26, 28 interconnected by upper and lower rails 30, 32. It is preferred that each stile and rail 26, 28 and 30, 32, respectively, have an inner surface or wall 34 in which is formed a rabbit, dado, or similar recess configured to receive and retain the peripheral edges of window panel assembly 20.

FIG. 5 generally illustrates the primary components of one embodiment of the invention 20, including a pair of transparent window panes 36 and 38, both of similar shape and dimension and each having an interior side 40 and an exterior side 42 terminating in a mutual peripheral edge 44, which defines each of the edges 44a, 44b, 44c, and 44d. The shape of the window panes 36, 38 may vary, ranging from square to generally circular or rounded. The thickness of each window pane may also vary, depending upon the specific purpose. For general residential applications, it is contemplated that each pane of glass have a thickness of at least 3/32 inch and as thick as 1/4 inch. The glass may be tempered or heat-treated and, depending upon the particular application (such as a sliding door), may also include an anti-laceration coating of a polymeric film.

Disposed wholly between the two window panes 36, 38 and located slightly in from peripheral edge 44 of each pane 36, 38 is one embodiment of a spacer assembly 50 contemplated by this invention. It is preferred that spacer assembly 50 is formed from a single length of generally rectangular tubing 52, having a first end 54 interconnected to an opposite end 56 by an appropriate coupler described below and formed into a shape which generally conforms to the shape of the window panes 36, 38. In the embodiment shown in FIG. 5, tubing 52 forming spacer 50 conforms generally to the rectangular shape of panes 36, 38 and includes four right-angle folds or bends, each generally identified as 58, in order to make the 360 degree course necessary to interconnect the two ends 54, 56 together. In this configuration, tubing 52 includes an inner wall 60 and an outer wall 62 interconnected by opposing sidewalls 64, 66. As described in greater detail below, the width of spacer 50 is substantially constant along its entire length even though the bent corners 58 were formed without mandrels or side clamps to control deformation.

Figure 6:
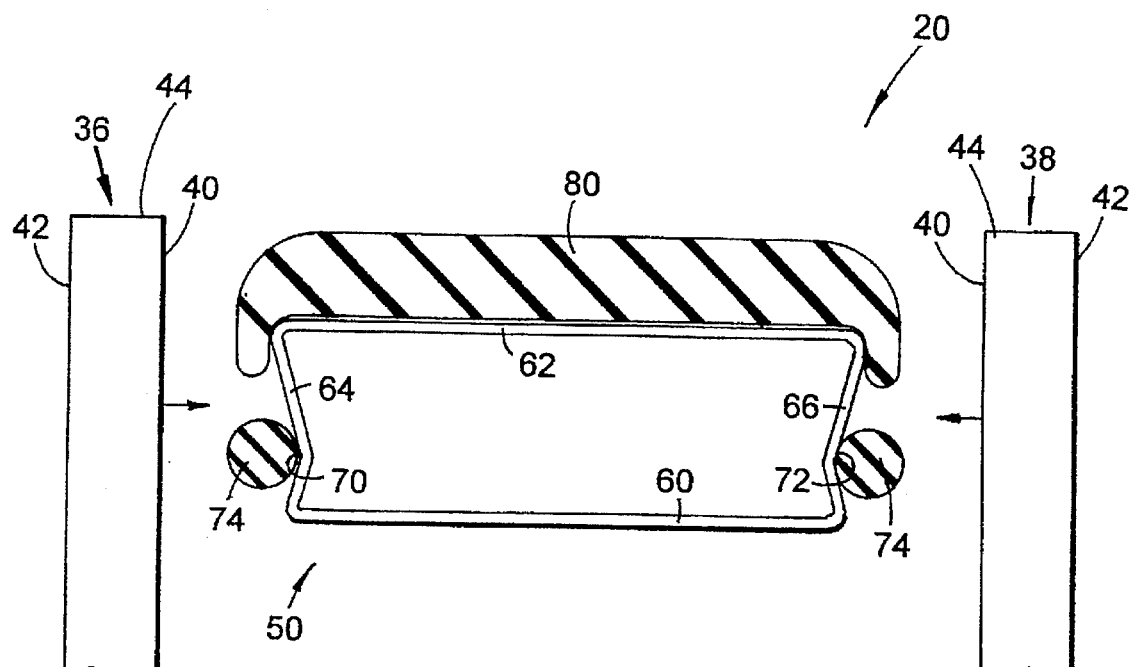
FIGS. 6 and 7 are section views of the window panel assembly shown in FIG. 5 in an unassembled and assembled configuration, respectively.
Figure 7:
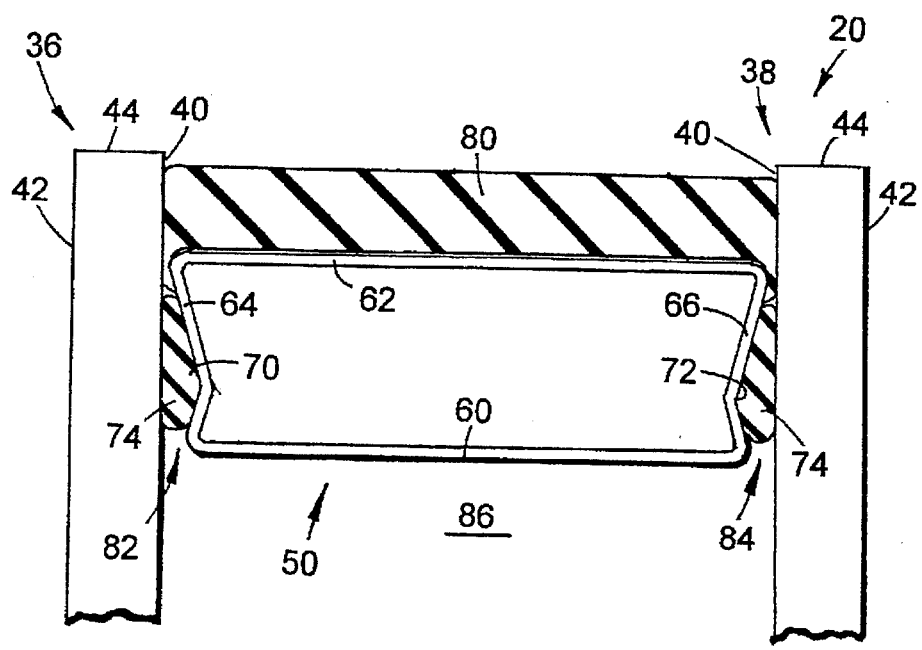

Referring to FIGS. 6 and 7, a portion of the window panel assembly is shown in section view taken along a plane through one of the edges of the window panel assembly 20. The figures illustrate the spacer assembly 50 in greater detail, before and after assembly on the window panes 36, 38. Tubing 52 is preferably formed from a metal, most preferably stainless steel or aluminum, although an extruded polymeric material may also be used. Tubing 52 is preferably formed from flat stock folded and bent into the generally rectangular shape where the edges of the strip are welded or joined together to make the tubing more rigid. Alternatively, the spacer tubing 52 may be extruded into the same cross-sectional profile. The preferred cross-sectional shape or profile of tubing 52 is generally rectangular so as to provide a small elevational profile. Other polygonal tubular shapes may also be used including tubes having a generally a frustum-type cross section wherein one wall is longer than the opposing parallel wall. As mentioned above, tubing 52 includes an outer wall 62, preferably having a width between 1.0 and 0.25 inch. The opposite or inner wall 60 is preferably parallel to outer wall 62, but of a lesser width. It is preferred that wall 60 be between 0.1 and 0.3 inch shorter than the outer wall. The sidewalls 64, 66 interconnecting the inner and outer walls are preferably concave or are creased (V-shaped). In a preferred embodiment, the concave surface or crease 70, 72 is closer to inner wall 60 than to outer wall 62. The concave or creased structure 70, 72 along each wall 64, 66 may be formed during the manufacturing of the tubing, or before or during the measuring and cutting of the tubing 52 to length for the particular application. For example, one way to form indentations 70, 72 in sidewalls 64, 66 is to run the length of tubing 52 between a pair of opposing crimping wheels or rollers having a profile sufficient to deform the metal sides inwardly.

It is preferred that a bead of sealer/adhesive 74 be deposited along each indentation or channel 70, 72 running the length of walls 64, 66. A preferred sealer 74 is polyisobutylene, extruded in each indentation 70, 72 along the entire length of tubing 52, most preferably prior to the shaping or bending of the tubing to form the closed pattern. Substantially simultaneously with the extrusion of the sealer 74, a secondary seal 80, such as polyurethane, is provided over outer wall 62 such that it completely covers the outer wall and partially wraps around onto sidewalls 64, 66. With the beads 74 of the primary sealer in the channels or indentations 70, 72, and with the secondary seal 80 extruded onto outer wall 62, the tubing 52 is bent to the desired shape and the ends interconnected as described below. One machine capable of extruding the sealant is the Model 216 extruder available from Glass Equipment Development Company of Twinsburg, Ohio.

Once in the configuration shown in FIG. 6, the spacer assembly 50 is located between the inner surfaces 40 of the two panes 36, 38. Under an application of heat and compressive force, the beads of sealer 74 are deformed so as to substantially fill a space 82, 84 between sidewalls 64, 66 and the inner surface 40 of each pane. The compressive force also causes the portions of the secondary seal 80 extending over onto sides 64, 66 to also be deformed, insuring a good contact with each surface 40 of panes 36, 38. Combined, the primary and secondary seals 74, 80 form an air-tight barrier between the interior insulating space 86 and the peripheral edges 44 of the panes.

Figure 8:
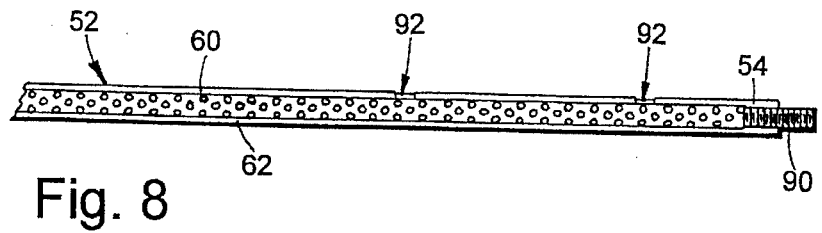
FIG. 8 is a fragmentary view along a length of a spacer of this invention.
Figure 9:
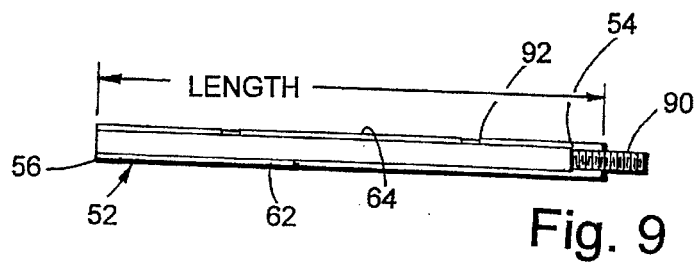
FIG. 9 is a section view of the spacer of this invention cut to length.

In another embodiment of the invention, each length of tubing 52 contains a desiccant material 88 (FIG. 8), most preferably an insoluble drying agent such as silica gel crystals. Desiccant 88 is retained in the tubing by one or more plugs 90 placed in the ends of the tubing. Prior to bending or the extrusion of the sealant, the tubing 52 is cut to length (FIG. 9) for the appropriate application and has holes 92 drilled or punched in inner wall 60 at appropriate locations in order to retain structures within the insulating space 86, such as mutton bars for grillwork or venetian blinds (not shown). If no structures are to be used, the inner wall 60 may contain a plurality of small perforations (not shown) to permit the gas within the insulating space 86 access to the desiccant 88 within the tubing.

Figure 10:
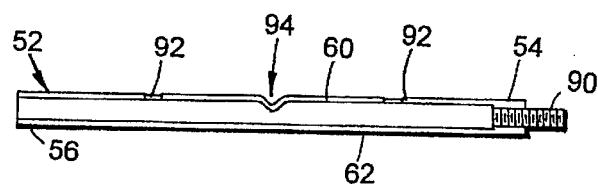
FIG. 10 illustrates the spacer of this invention prior to bending.

Prior to bending, the inner wall 60 of tubing 52 is either manually or mechanically crimped along a line 94 (FIG. 10) at a point where a bend (such as 58 shown in FIG. 5) is to be located. It is preferred that each crimp 94 be made subsequent to cutting the tube to length and prior to the extrusion or deposition of the sealer described above. The measuring, cutting, and crimping of tubing 52 and the extrusion of the sealers 74 and 80 are all preferably done mechanically so that each piece does not need to be produced separately by hand. It is contemplated that a single machine or combination of machines can be used to produce each spacer. For example, one machine may contain a magazine of tubes, each 18 to 22 feet long. Each length of tubing may be fed lineally into the machine where the tubing is automatically measured to the appropriate length and cut. The cut length of tubing is conveyed down the line a predetermined distance to another station where any desiccant in the ends of the tube is removed. Once the desiccant is removed, one end 54 of the tube receives a styrofoam plug, and the opposite end 56 receives a key described below. The plug and key keeps the desiccant within the tube. It is further contemplated that either at the same station or another down the line the length of tubing is drilled along the inner wall 60 so that the finished spacer will support mutton bars or other accessories. Simultaneously, a vent hole is drilled through the tubing at the end 56 receiving the key. Subsequent to drilling, the length of tubing is conveyed to a station which forms the crimps 94 on wall 60. It is expected that a chisel-like point or blade may impact wall 60 to form the crimp 94. The crimping positions will be automatically determined, indicating to the assembler where to make the bends. A prototype machine for performing these steps has been ordered from the LISEC Corporation of Austria. The extrusion device described above may be used to prepare the tubing for bending.

Once the tubing has been cut, crimped, and received the beads of sealant, the assembler bends tubing 52 (FIG. 11) about each corner crimp 94 such that inner wall 60 is disposed to the interior of the spacer pattern. Because the beads of sealant 74 and 80 are still hot after extrusion (approximately 130° F.), the assembler bending tubing 52 is wearing special gloves to prevent the sealants from sticking and burning the assembler's hands. In this manner, the assembler can quickly form the bends or corners. Once the last corner is formed, the foam plug is removed and the opposing ends 54, 56 of the tubing are joined by a plug 90 described below. Because sidewalls 64, 66 are slightly concave or have been crimped inwardly along their length, any bending moments or force exerted on inner and outer walls 60, 62 along an axis or plane generally including the sidewalls results in the sidewalls 64, 66 deforming inwardly. Also upon bending or folding, the inwardly collapsing sidewalls 64, 66 tend to draw or drag the corner edge between the sidewalls and the inner and outer walls inwardly. Because the inner wall 60 is also narrower than outer wall 62, any deformation of wall 60 resulting from the folding along the crimp line 94 remains within the width of outer wall 62.

Following the folding of the spacer assembly tubing 52, the window panes 36, 38 sandwich the spacer assembly 50 therebetween. The window panel assembly is preferably passed under a heated roll press to apply the appropriate compressive force to deform the seals 74, 80 and form a good air-tight seal with each pane 36, 38. Because the space between the panels is reduced and compressed against spacer assembly 50, and because the heated press rollers tend to heat the air within the spacer assembly, the vent hole allows the air to equalize. The vent hole remains open until the window assembly has cooled, allowing air back into the space to prevent implosion of the window panes.

It is contemplated that provision be made on spacer assembly 50 for the evacuation of insulation space 86 and/or filling of the space 86 with an inert gas, such as Argon. In one embodiment, the hole drilled through the tubing 52 proximate end 56 aligns with a like hole in the key or plug 90 to provide access from the exterior into space 86. A nozzle may be tightly fit into the hole so that a vacuum may be drawn on the space 86. Afterwards, the volume may be filled through the same nozzle with the desired gas. Once filled, a threaded plug, cap, or seal may fill the hole and be covered with the secondary seal 80.

In a preferred embodiment, the plug or key 90 (FIG. 12) is made from an injection-molded, glass-filled nylon material and is configured such that it is non-directional and received tightly by both ends 54, 56 to make the connection. The plug or key 90 may be slightly oversized in order to tightly wedge each end in the respective end 54, 56 of the tubing 52. Key 90 includes an elongate body 95 of generally rectangular shape having opposing, tapered ends 96, 97. Intermediate ends 94, 96 is a center flange 98 to prevent the assembly from inserting the key too far into one of the ends of the tubing 52. Key 92 may also contain a pair of transversely extending holes or slots 100, each extending through the key on opposite sides of the centering flange. Holes 100 are provided for the gas filling port described above. Alternatively, threaded fasteners may be received through each hole 100 and passing through the inner and/or outer walls so that the spacer joint will not come apart.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. An insulated window panel assembly, comprising:
   at least two window panes spaced from each other by a predetermined distance to define a space therebetween;
   a spacer element disposed entirely between said at least two window panes, said spacer element having an inner wall facing said space, and interconnected to an outer wall by a pair of opposing, concave lateral sidewalls, generally said inner wall having a width less than said outer wall;
   a bead of polymeric sealing material deposited on each of said opposing generally concave lateral sidewalls sealing against said at least two window panes.

2. The insulated window panel assembly as defined in claim 1, wherein said spacer element is bent to form a closed pattern, having a first end interconnected to a second opposite end by a coupler.

3. The insulated window panel assembly as defined in claim 1, wherein said spacer element is bent to form corners and conform said spacer element to an overall shape of said window panes, said inner wall and said pair of opposing generally concave lateral sidewalls being crimped without extending or bulging beyond the width of said outer wall.

4. The insulated window panel assembly as defined in claim 1, wherein said inner wall includes a crimp line to define an axis about which a corner is formed.

5. The insulated window panel assembly as defined in claim 1, wherein said window panes are selected from the group comprising glass, polymeric sheets, and laminates.

6. The insulated window panel assembly as defined in claim 1, wherein said spacer element is manufactured from the group comprising aluminum and polymeric materials.

7. The insulated window panel assembly as defined in claim 1, wherein said bead of said polymeric seal is deposited in each of said concave sidewalls prior to bending said spacer element to conform to said window panes.

8. The insulated window panel assembly as defined in claim 1, wherein said outer wall and said inner wall are disposed between an inwardly facing surface of each of said at least two window panes.

9. An insulated window panel, comprising:
   two window panes spaced from each other to define a space therebetween;
   a generally polygonal tube having a first wall interconnected to an opposing second wall by a pair of opposing sidewalls, said first wall facing into the space and said second wall disposed wholly between said window panes and said first wall having a width less than said second wall; and
   a bead of polymeric sealing material deposited in each of said opposing sidewalls sealing against said two window pane.

10. The insulated window panel as defined in claim 9, wherein said polygonal tube is an extrusion.

11. The insulated window panel as defined in claim 9, wherein said polygonal tube includes a strip of material of a predetermined length defining a longitudinal axis, and folded into a generally rectangular tube.

12. The insulated window panel as defined in claim 11, wherein said strip of material is plastic or metal.

13. The insulated window panel as defined in claim 9, further including:
   an absorbent material partially filling said generally polygonal tube; and
   said first wall including a plurality of perforations to allow a gas to pass therethrough.

14. The insulated window panel as defined in claim 9 wherein said generally polygonal tube is one piece having first and second ends interconnected to define a closed pattern.

15. A method for manufacturing an insulated window assembly, comprising the steps of:
   forming a length of spacer tubing into a generally polygonal profile, including forming a first wall having a first width, a second opposing wall having a second width less than said first width, and a pair of opposing sidewalls interconnecting said first and second walls, each of said sidewalls extending the length of said spacer tubing;
   applying a bead of sealer to said sidewalls;
   crimping said second wall of said spacer tubing along at least one point to define a fold line;
   bending said spacer tubing at said at least one point to form a corner, said bending step resulting in said second wall moving relatively toward said first wall such that each of said sidewalls does not extend outwardly beyond said first width of said first wall; and
   interconnecting a first end of said spacer tubing with a second opposite end of said spacer tubing to form a closed pattern; and
   disposing said closed pattern wholly between a pair of window panes.

16. The method as defined in claim 15, wherein the step of forming said length of spacer tubing includes extruding said spacer tubing to form said length of tubing.

17. The method as defined in claim 15, wherein the step of forming said length of spacer tubing includes:
   folding a generally flat strip of material into said generally polygonal profile; and
   welding a seam to join opposite edges of said strip of material.

18. The method as defined in claim 15, further including the step of locating an absorbent material in an interior of said length of spacer tubing.

19. The method as defined in claim 18, further including providing perforations through said second wall into said interior of said spacer tubing to permit a gas therethrough.

* * * * *

UNITED STATES PATENT AND TRADEMARK OFFICE
CERTIFICATE OF CORRECTION

PATENT NO.  : 5,640,828
DATED       : June 24, 1997
INVENTORS   : Myron D. Reeves and Edward Schield It is certified that error appears in the above-identified patent and that said Letters Patent is hereby corrected as shown below:

Column 3, line 26;
    "referre&" should be --reference--.

Column 4, line 48;
    Delete "a".

Column 4, line 57;
    After "(V-shaped)", insert --along line 68--.

Column 7, claim 1[20], line 23;
    After "opposing" delete "," and insert --generally--.

Column 7, claim 1[20], line 24;
    Delete "generally".

Column 8, claim 11, line 11;
    Delete "rectangular" and insert --polygonal--.

Signed and Sealed this

Thirteenth Day of January, 1998

Attest:

BRUCE LEHMAN

*Attesting Officer*        *Commissioner of Patents and Trademarks*